(12) United States Patent
Oblisk

(10) Patent No.: US 9,380,914 B2
(45) Date of Patent: Jul. 5, 2016

(54) COMESTIBLE PRODUCT CARRIER AND/OR HANDLE AND ASSOCIATED METHODS

(71) Applicant: Wal-Mart Stores, Inc., Bentonville, AR (US)

(72) Inventor: David T. Oblisk, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 742 days.

(21) Appl. No.: 13/667,702

(22) Filed: Nov. 2, 2012

(65) Prior Publication Data

US 2014/0053507 A1    Feb. 27, 2014

Related U.S. Application Data

(60) Provisional application No. 61/692,849, filed on Aug. 24, 2012.

(51) Int. Cl.

| *A47J 47/14* | (2006.01) |
|---|---|
| *B65B 61/14* | (2006.01) |
| *B65D 71/28* | (2006.01) |
| *B65D 61/00* | (2006.01) |

(Continued)

(52) U.S. Cl.
CPC ............... *A47J 47/14* (2013.01); *B65B 61/14* (2013.01); *B65D 25/28* (2013.01); *B65D 61/00* (2013.01); *B65D 71/28* (2013.01); *B65D 71/30* (2013.01); *B65D 75/02* (2013.01); *B65D 2571/00716* (2013.01)

(58) Field of Classification Search
CPC .... B65B 25/16; B65B 61/14; A47G 23/0616; A47G 21/001; B65D 71/30; B65D 71/28; B65D 2571/00716; B65D 2571/0079; B65D 77/0433; B65D 5/46112; B65D 5/46144; B65D 5/46072; A47J 47/14; A21D 13/0025; B31C 13/00; Y10S 229/938
USPC ......... 53/413, 134.1, 594, 169; 206/162, 165, 206/174, 175; 229/117.11, 117.14, 117.15, 229/117.19, 117.23, 87.04, 87.08, 87.09, 229/938; 294/31.2, 152, 165; 426/110, 115, 426/394

See application file for complete search history.

(56) References Cited

U.S. PATENT DOCUMENTS

| 1,869,609 A | 8/1932 | Morales |
| 2,074,638 A * | 3/1937 | Black .................. 229/117.14 |

(Continued)

FOREIGN PATENT DOCUMENTS

| DE | 3024212 A1 * | 1/1982 | ........... A47G 21/001 |
| FR | 2612498 A1 * | 9/1988 | ........... A47G 21/001 |

*Primary Examiner* — Stephen F Gerrity
(74) *Attorney, Agent, or Firm* — McCarter & English, LLP; David R. Burns

(57) ABSTRACT

Exemplary embodiments are directed to a sandwich carrier handle and carrier for transporting a sandwich, including a plurality of wall portions hingedly joined at a plurality of fold lines. The plurality of wall portions are configured and dimensioned to fold at the plurality of fold lines to form a structure which wraps around the sandwich carrier. The exemplary sandwich carrier handle includes a first end including a first handle portion and a second end including a second handle portion. The first and second handle portions are configured and dimensioned to releasably interlock. The exemplary sandwich carrier handle includes a first open end and an opposing open end of the structure configured and dimensioned to permit the passage of the sandwich carrier therethrough. Exemplary embodiments are further directed to a method of transporting a sandwich carrier.

21 Claims, 12 Drawing Sheets

(51) Int. Cl.
  *B65D 25/28* (2006.01)
  *B65D 71/30* (2006.01)
  *B65D 75/02* (2006.01)

(56) References Cited

U.S. PATENT DOCUMENTS

| | | | |
|---|---|---|---|
| 2,145,481 A | 1/1939 | Harvey | |
| 2,731,776 A * | 1/1956 | Currie | 53/398 |
| 2,874,870 A * | 2/1959 | Collura | 206/141 |
| 2,892,719 A | 6/1959 | Lynn | |
| 3,266,687 A * | 8/1966 | Isoldi | 206/451 |
| 3,319,682 A | 5/1967 | Hall | |
| 3,391,782 A | 7/1968 | Kaspar | |
| 3,392,876 A * | 7/1968 | Allred | 206/143 |
| 3,446,416 A | 5/1969 | Epstein | |
| 3,517,868 A | 6/1970 | Daughtry | |
| 3,703,982 A | 11/1972 | Daughtry | |
| 3,747,743 A * | 7/1973 | Hoffmann, Jr. | 206/321 |
| 4,055,287 A * | 10/1977 | Champenois, Jr. | 294/141 |
| 4,266,668 A * | 5/1981 | Paek | 206/557 |
| 4,289,266 A * | 9/1981 | Maroszek | 229/117.13 |
| 4,399,668 A * | 8/1983 | Williamson | 62/457.4 |
| 4,491,356 A * | 1/1985 | Carr, Jr. | 294/31.2 |
| 4,494,785 A | 1/1985 | Song | |
| 4,575,000 A * | 3/1986 | Gordon et al. | 229/87.11 |
| 4,709,851 A * | 12/1987 | Vanasse | 229/87.09 |
| 4,890,873 A * | 1/1990 | Prada et al. | 294/152 |
| 4,895,295 A * | 1/1990 | Montgomery et al. | 294/165 |
| 5,518,169 A | 5/1996 | Beales | |
| 5,533,639 A * | 7/1996 | Myers | 220/23.8 |
| D384,858 S | 10/1997 | Kurz | |
| 5,875,894 A | 3/1999 | Stromme | |
| 5,899,377 A | 5/1999 | Speese et al. | |
| 5,927,660 A | 7/1999 | McNerney et al. | |
| D428,765 S | 8/2000 | Hughes | |
| 6,245,368 B1 | 6/2001 | Sullivan et al. | |
| 6,253,993 B1 * | 7/2001 | Lloyd et al. | B65D 5/46144 229/117.15 |
| 6,390,299 B1 * | 5/2002 | Mellon et al. | 206/485 |
| 6,615,985 B1 * | 9/2003 | Foreman | 206/485 |
| 6,892,513 B1 * | 5/2005 | Barr et al. | 53/458 |
| 6,966,589 B1 * | 11/2005 | Grbic | A45C 13/30 294/150 |
| 7,013,616 B1 * | 3/2006 | Powers et al. | 53/397 |
| D523,698 S | 6/2006 | David | |
| D524,112 S | 7/2006 | Cogley | |
| D524,113 S | 7/2006 | Dodge et al. | |
| 7,968,132 B2 | 6/2011 | Archie, Jr. | |
| 8,354,131 B2 * | 1/2013 | Gan et al. | 426/120 |
| 2002/0030090 A1 * | 3/2002 | Ferguson | 229/117 |
| 2002/0109361 A1 | 8/2002 | Parthenis | |
| 2002/0129581 A1 | 9/2002 | Correll | |
| 2002/0178977 A1 | 12/2002 | Poarch et al. | |
| 2004/0101605 A1 | 5/2004 | Sigel | |
| 2006/0121161 A1 | 6/2006 | Garrett | |
| 2010/0108748 A1 * | 5/2010 | Fleming et al. | 229/117.13 |
| 2011/0084121 A1 | 4/2011 | Sanders | |
| 2011/0215097 A1 | 9/2011 | Archie, Jr. et al. | |
| 2013/0032616 A1 * | 2/2013 | Lewis | B65D 71/0011 224/191 |

* cited by examiner

COMESTIBLE PRODUCT CARRIER AND/OR HANDLE AND ASSOCIATED METHODS

RELATED APPLICATIONS

This application is based on and claims the priority benefit of U.S. Provisional Application No. 61/692,849, filed Aug. 24, 2012. The entire content of the foregoing provisional patent application is incorporated herein by reference.

TECHNICAL FIELD

The present disclosure relates to a comestible product carrier and/or handle and associated methods and, in particular, to a comestible product carrier and/or handle for transporting a comestible product carrier.

BACKGROUND

Many establishments, e.g., restaurants, grocery stores, delis, and the like, offer sandwiches of normal lengths, e.g., a six inch sandwich, a foot-long sandwich, and the like. In addition, some establishments offer "party sandwiches" that can feed a group of people. For example, party sandwiches can be three, four, five, six feet long or more. Once a party sandwich has been prepared, it is generally placed on a support to permit transport of the sandwich by a customer. Many forms of supports for transporting sandwiches exist. As an example, the sandwich can be supported by a piece of wood or cardboard. As another example, the sandwich can be cut into pieces that are arranged on a tray.

SUMMARY

In accordance with embodiments of the present disclosure, an exemplary apparatus for transporting a comestible product carrier is provided, including wall portions hingedly joined relative to each other. The wall portions can be configured and dimensioned to form a structure which wraps around the comestible product carrier, e.g., a sandwich carrier, and the like. The exemplary apparatus includes a first end including a first handle portion and a second end including a second handle portion. The first handle portion and the second handle portion can be configured and dimensioned to releasably interlock. In a carrier or interlockable configuration, the exemplary apparatus includes a first open end and an opposing second open end of the structure configured and dimensioned to permit the passage and/or the securing of the comestible product carrier therethrough.

The wall portions include a bottom wall to support the comestible product carrier and partitioned first and second top wall portions. The wall portions further include parallel first and second side wall portions. The first handle portion can be hingedly joined to the first top wall and the second handle portion can be hingedly joined to the second top wall. The first handle portion can include a first set of score lines or perforations for creating a first opening and the second handle portion can include a second set of score lines or perforations for creating a second opening. The first and second openings can be configured and dimensioned to receive a hand.

The comestible product carrier can form a surface configured and dimensioned to support a comestible product, e.g., a sandwich, and the like, along a length and a width of the comestible product. For example, the comestible product carrier can be a U-board or U-shaped, i.e., a carrier having two side walls, a bottom wall, and an open wall opposing the bottom wall. Thus, in a folded configuration, the comestible product carrier can define a U-shaped cross-section or a rectangular cross-section.

In accordance with embodiments of the present disclosure, an exemplary method of transporting a comestible product carrier is provided, including folding an apparatus. The exemplary apparatus can include wall portions hingedly joined relative to each other. The wall portions can be configured and dimensioned to form a structure which wraps around the comestible product carrier. The exemplary apparatus can include a first end including a first handle portion and a second end including a second handle portion. The first handle portion and the second handle portion can be configured and dimensioned to releasably interlock. In a carrier or interlockable configuration, the exemplary apparatus further includes a first open end and an opposing second open end of the structure configured and dimensioned to permit the passage and the securing of the comestible product carrier therethrough.

The exemplary method can include wrapping the apparatus around the comestible product carrier and interlocking the first handle portion and the second handle portion. The exemplary method can further include positioning a comestible product in the comestible product carrier. Interlocking the first handle portion and the second handle portion can create an opening configured and dimensioned to receive a hand.

In accordance with embodiments of the present disclosure an exemplary system for transporting a comestible product is provided that includes a comestible product carrier and a handle structure. The comestible product carrier has a surface for supporting a length of the comestible product. The handle structure in a carrier or interlockable configuration has first and second opposing open ends, an interior area accessible through the first and second open ends, a bottom wall portion, and a handle portion. The handle structure surrounds a portion of the comestible product carrier so that the bottom wall portion supports a portion of the surface of the comestible product. The handle portion includes an area for grasping the handle structure to facilitate transport of the comestible product carrier and the comestible product carrier extends beyond the first and second opposing open ends of the handle structure. In some exemplary embodiments, the comestible product carrier can be a unitary structure having a first unfolded state and a second folded state.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed comestible product carrier handles and associated methods, reference is made to the accompanying figures, wherein.

DESCRIPTION OF EXEMPLARY EMBODIMENTS

Exemplary embodiments of the present disclosure are directed to packaging and transporting of a comestible product. Exemplary embodiments can provide a comestible product carrier and a handle structure configured to surround at least a portion of the comestible product carrier and the comestible product. A bottom wall portion of the handle structure can support a portion of the comestible product and the handle structure can include an area that can be grasped by a user to facilitate transport of a comestible product disposed on the comestible product carrier. Exemplary embodiments of the present disclosure advantageously provide a stable and convenient structure for the packaging and transporting of a comestible product, such as a sandwich.

Figure 1A:
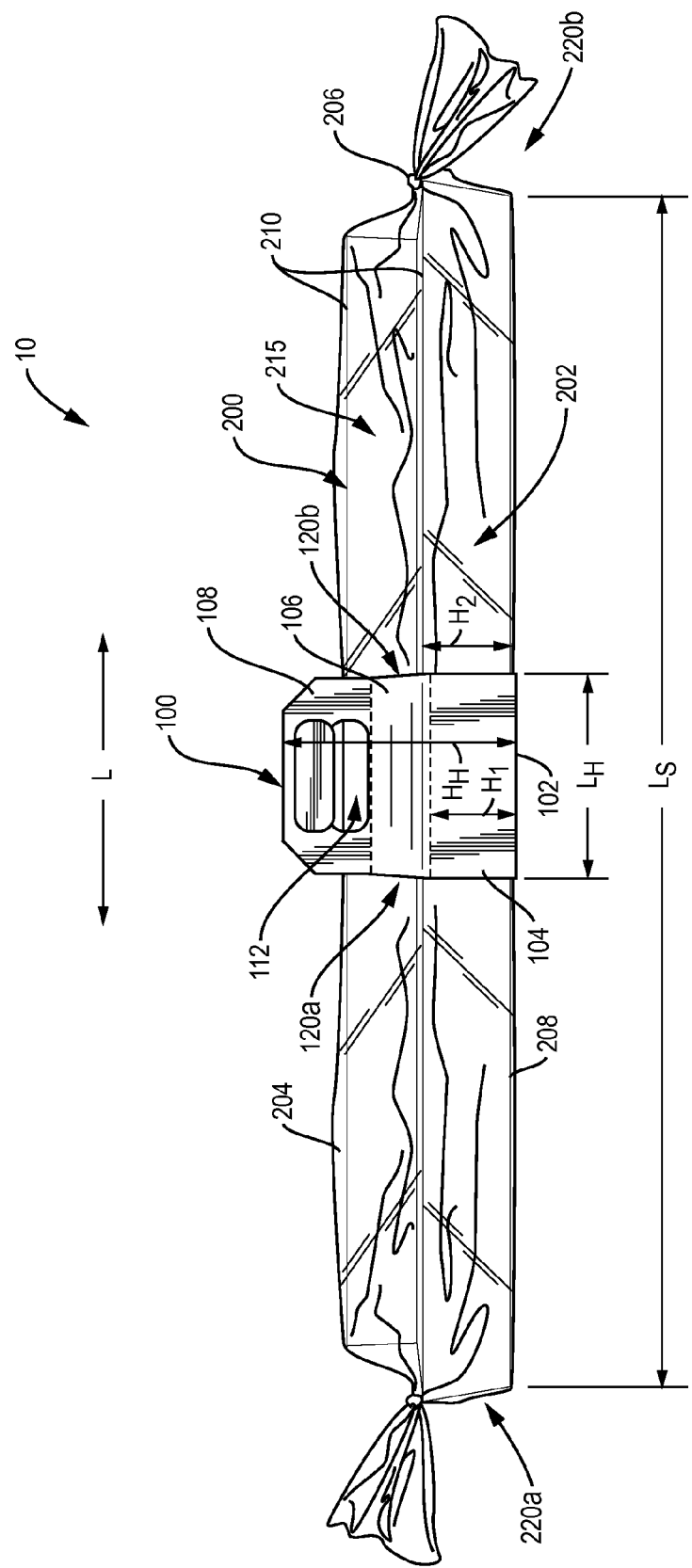
FIG. 1A shows a side view of an exemplary comestible product carrier system including an exemplary comestible product carrier and an exemplary comestible product carrier handle.

In accordance with embodiments of the present disclosure, an exemplary comestible product carrier system 10, e.g., a sandwich carrier system, is provided in FIG. 1A, including an exemplary comestible product carrier handle 100 (hereinafter "handle 100"), e.g., a sandwich carrier handle, and an exemplary comestible product carrier 200 (hereinafter "carrier 200"), e.g., a sandwich carrier. The system 10 can be configured to hold and facilitate transport of a comestible product, such as a sandwich or any other suitable comestible product. For example, in some embodiments, the system 10 can be configured and dimensioned to hold a party sandwich, e.g., a sandwich that is greater than one (1) foot in length.

The handle 100 can include a bottom wall portion 102, foldable side wall portions 104, foldable top wall portions 106, and foldable handle portions 108. The side wall portions 104 can extend from the bottom wall portion 102 to the top wall portions 106 and the top wall portions 106 can extend from the side wall portions 104 to the handle portions 108 to define an interior area (obscured) configured to receive at least a portion of the carrier 200. The side wall portions 104 can have a height $H_1$ and the handle 100 can have a height $H_H$ defined by the side wall portions 104, the top wall portions 106 and the handle portions 108.

In exemplary embodiments, the handle 100 can extend along a longitudinal axis L from a first proximal end 120a to a second distal end 120b. A length $L_H$ of the handle 100 can be defined as the distance between the first and second ends 120a and 120b measured along a longitudinal axis L. Openings can be formed at the first and second ends 120a and 120b, respectively to provide access to the interior area of the handle 100. An opening 112 can be formed at the handle portions 108 configured and dimensioned to receive a hand for gripping the handle portions 108.

The exemplary carrier 200 can include a support 202, e.g., a U-board, a container, and the like, and can further include a sleeve 204 configured and dimensioned to receive and surround the support 202. The support 202 can extend along a longitudinal axis L from a first proximal end 220a to a second distal end 220b. A length $L_S$ of the support 202 can be defined as the distance between the first and second ends 220a and 220b measured along the longitudinal axis L. In exemplary embodiments, the length $L_S$ of the support 202 can be greater than the length $L_H$ of the handle 100 ($L_S > L_H$). For example, in one embodiment, the support 202 can be approximately two, three, or four times as long as the handle 100.

In some embodiments, the support 202 can include a bottom wall portion 208 and foldable first and second side wall portions 210 to define an area 215 for receiving the comestible product. The bottom wall portion 208 can provide a support upon which the comestible product can rest and the first and second side wall portions 210 can aid in securing the comestible product within the area 215. In an exemplary embodiment, the side wall portions 210 can generally extend perpendicularly from the bottom wall portion and can have a height $H_2$.

The sleeve 204 can be, e.g., a plastic sleeve, which can be secured with a closure mechanism 206, knots and/or ties at both ends. A comestible product, e.g., a party sandwich, and the like, can thereby be positioned in the support 202, enclosed in the sleeve 204 and the sleeve 204 can further be secured with a closure mechanism 206 to maintain the comestible product in a clean environment. In some exemplary embodiments, the carrier 200 may be implemented without a sleeve 204.

As would be understood by those of ordinary skill in the art, the exemplary handle 100 can be folded, wrapped, and/or otherwise positioned around the carrier 200 such that the carrier 200 can be lifted and/or transported as desired by a user. In particular, the bottom wall 102 and the first and second side wall portions 104a and 104b of the handle 100 support the bottom and side surfaces of the support 202. The exemplary handle 100 can therefore be dimensioned such that sufficient support is provided along the bottom and/or side surfaces to maintain the carrier 200 in a horizontal and/or stable position. It should be understood that the exemplary handle 100 may be, e.g., initially folded and subsequently placed over the carrier 200 by guiding the carrier 200 through the openings at the first and second ends 120a and 120b and interior area defining an inner passage, wrapped around the carrier 200 during folding of the handle 100, and the like. In some exemplary embodiments, the handle 100 may be initially in a flat configuration and may further be folded and/or interlocked around the comestible product.

After being positioned and/or wrapped around the carrier 200, the position of the handle 100 may be, e.g., adjusted by sliding the handle 100 along the length of the carrier 200 to adjust the balance of the party sandwich. In some embodiments, the height $H_2$ of the side wall portions 210 of the support 202 can be approximately equal to or greater than the height $H_1$ of the side wall portions 104 ($H_2 \geq H_1$) such that the side wall portions 210 engage the bottom wall portion 102 and top wall portions 108 of the handle 100 to form a friction fit between the carrier 200 and the handle 100 to restrict and/or limit movement of the carrier in the handle 100. In some embodiments, the height $H_2$ of the side wall portions 210 of the support 202 can be approximately equal to or less than the height $H_1$ of the side wall portions 104 ($H_2 \geq H_1$) such that the side wall portions 210 engage the bottom wall portion 102 and side wall portions 104 of the handle 100 to form a friction fit between the carrier 200 and the handle 100 to restrict and/or limit movement of the carrier in the handle 100. In some exemplary embodiments, at least one of the inside surfaces of the handle 100 can include surface features (obscured), e.g., adhesives, rubber, ridges, and the like, for releasably securing the carrier 200 within the handle 100 to restrict or limit movement of the carrier 200 within the handle 100.

Figure 1B:
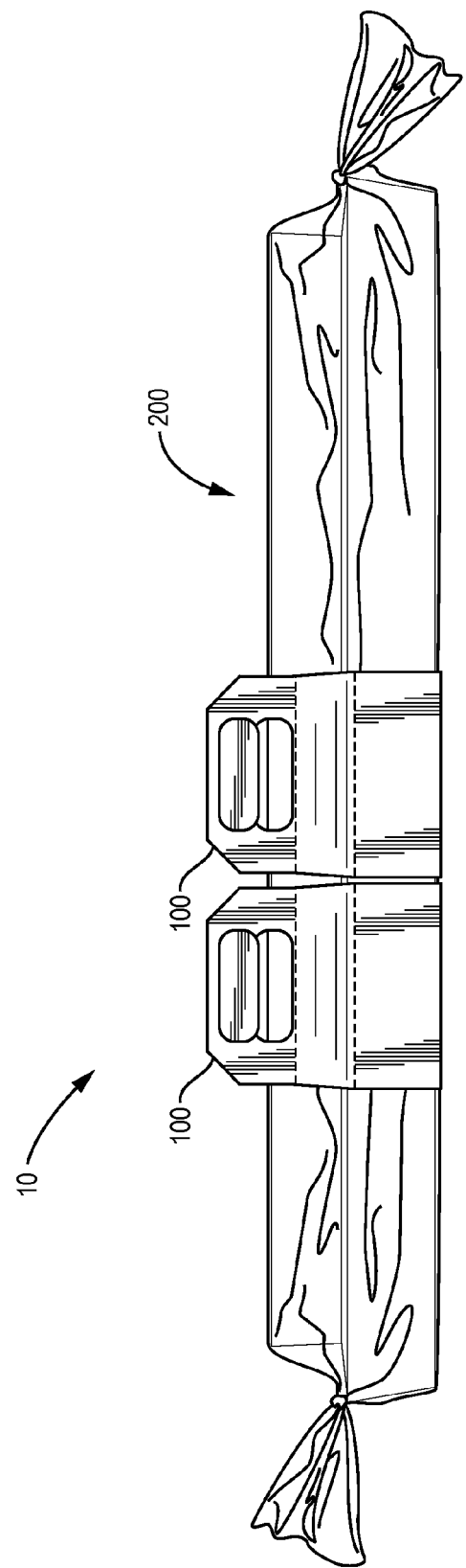
FIG. 1B shows a side view of another exemplary comestible product carrier system including an exemplary comestible product carrier and exemplary comestible product carrier handles.

Once a sandwich has been transported to its desired position, the handle 100 may be, e.g., unwrapped, slid off or out from the carrier 200, reused, and the like. Thus, the exemplary system 10 can be implemented to transport a comestible product with ease and/or in a stable manner to its desired location. While the present embodiment of the system 10 is illustrated with a single handle 100, exemplary embodiments of the system 10 can include any number of handles 100. For example, FIG. 1B shows an embodiment of the system 10 that includes two handles 100 positioned around the carrier 200. Although embodiments of the system 10 are discussed herein as being implemented for transport of a sandwich, in other exemplary embodiments, alternative comestible products may be transported using the exemplary embodiments of the system 10.

Figure 2:
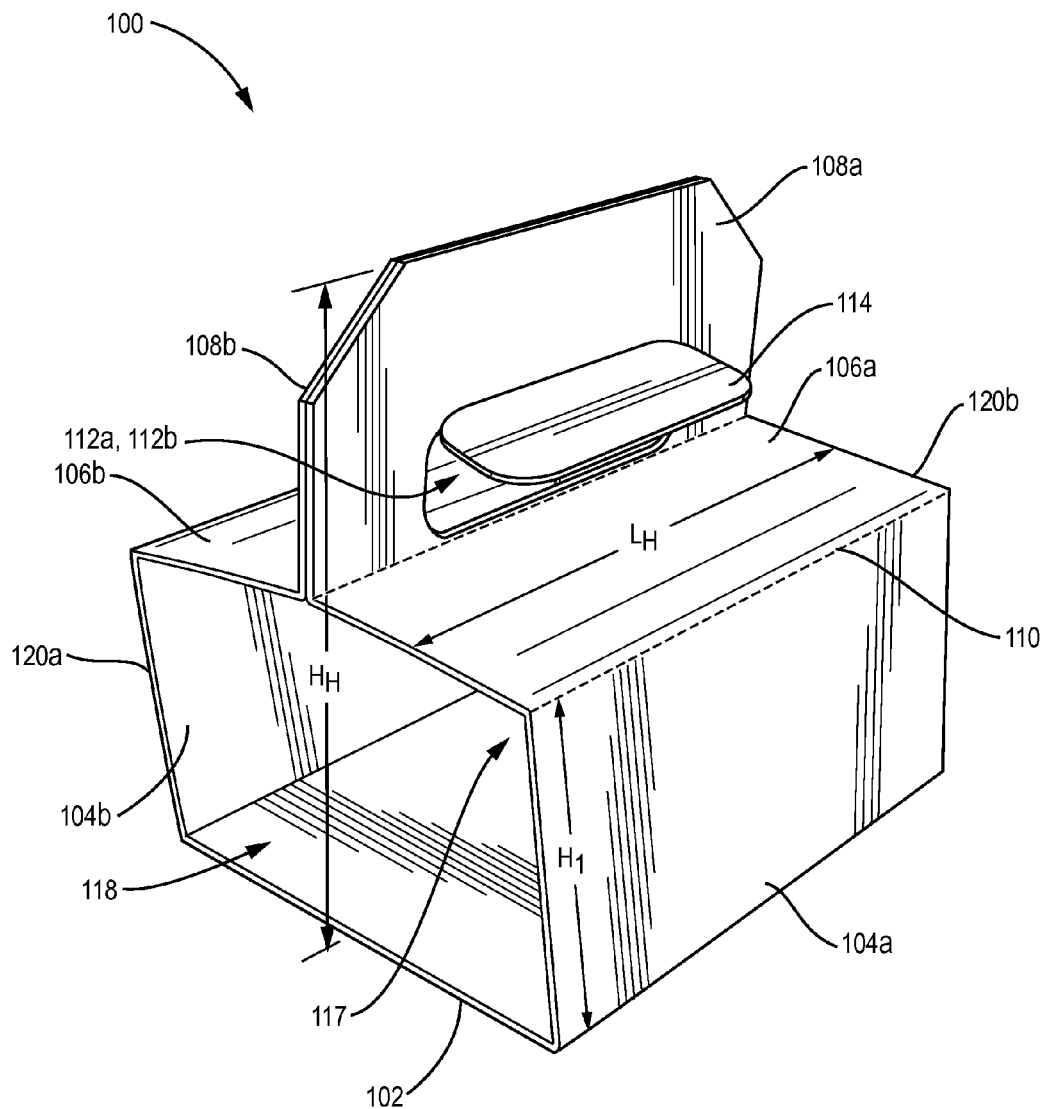
FIG. 2 shows a perspective view of an exemplary comestible product carrier handle in a fully folded position.

Turning now to FIG. 2, an exemplary embodiment of the handle 100 is shown in an assembled form, i.e., forming a structure configured to wrap around a carrier 200. As shown in FIG. 2, the bottom wall portion 102 can form a generally planar surface and the foldable side wall portions 102a and 102b in a folded state generally extend perpendicularly from opposing side edges of the bottom wall portion 102. The top wall portions 106a and 106b extend inward towards each other from upper edges of the side wall portions 104a and 104b, respectively, and over the bottom wall portion 102. In an exemplary embodiment, the top wall portions 106a and 106b can generally extend perpendicularly from the side wall portions 104a and 104b, respectively. The first and second handle portions 108a and 108b extend perpendicularly upwards from the inner edges of the top wall portions 106a and 106b, respectively. For example, in an exemplary embodiment, the handle portions 108a and 108b can generally extend perpendicularly outwardly from the top wall portions 106a and 106b, respectively.

The handle portions 108a and 108b can mate against each other and one or more flaps 114 of the handle portions 108a and/or 108b can be utilized to interlock the first and second handle portions 108a and 108b relative to each other. As can be seen in FIG. 2, one of the flaps 114 is folded to pass through the first and/or second openings 112a and 112b, to secure the handle portions 108a and 108b together; thereby preventing the first and second handle portions 108a and 108b from separating. In other embodiments, the handle portions 108a and 108b can be fastened to one another using a fastener, such as one or more clamps, clips, staples, adhesives, and/or any other suitable fastener.

Figure 3:
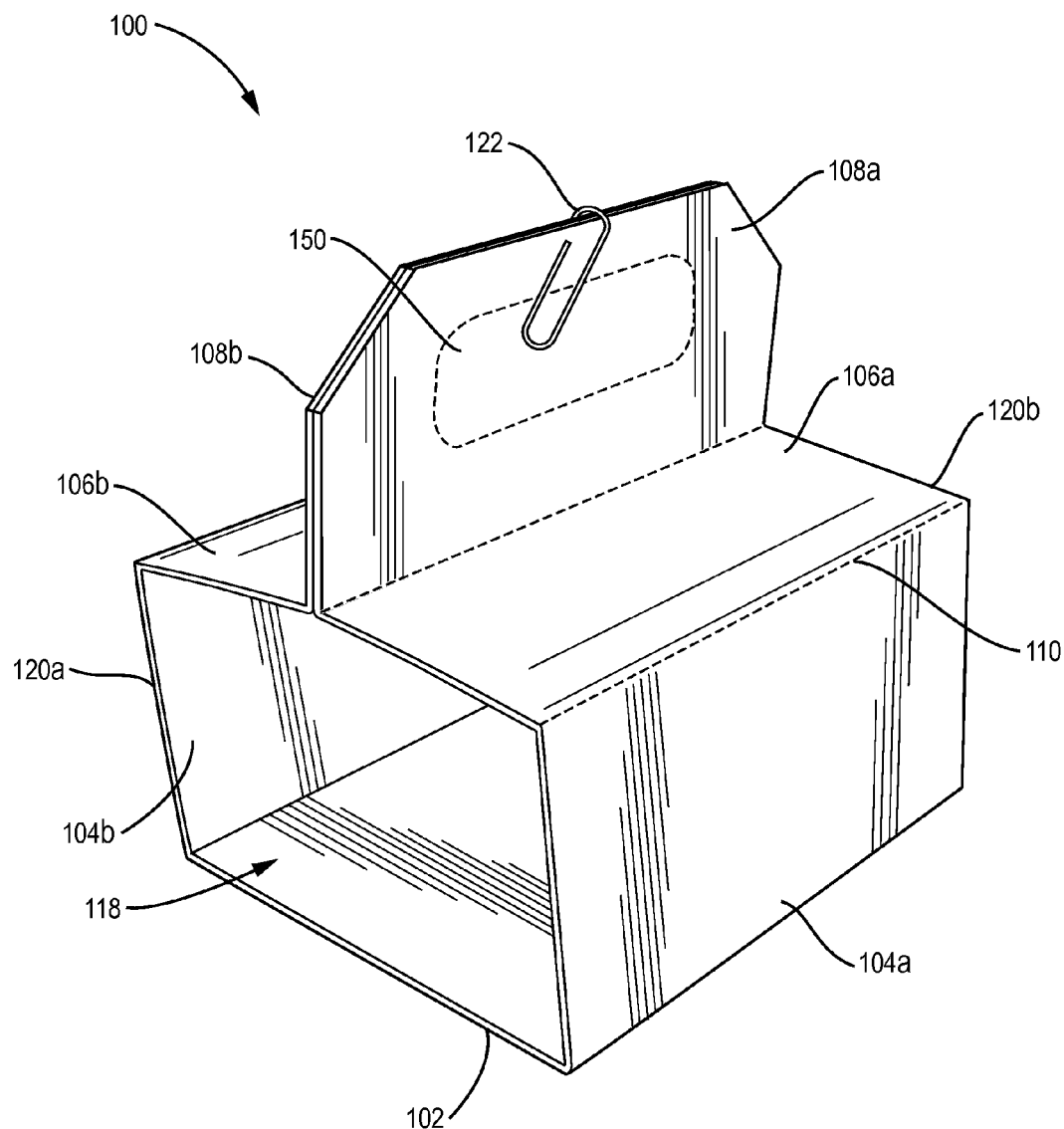
FIG. 3 shows a perspective view of an exemplary comestible product carrier handle in a fully folded position.

FIG. 3 is illustrative of an embodiment of the handle in which the top portions 108a and 108b are fastened to each other using an adhesive and an opening for grasping the handle portions 108a and 108b can be formed by removing a perforated portion 150 of the handle portions 108a and 108b.

As shown in FIG. 2, the folded handle 100 forms an inner passage 118 configured and dimensioned to receive a carrier 200 therethrough. In particular, inner passage 118 of the handle 100 structure can be defined by the first open end 120a, the opposing second open end 120b, and the interior area 117 to permit the passage and/or the securing of the carrier 200 therein, while still providing support to the carrier 200 by the bottom wall 102 and the first and second side wall portions 104a and 104b.

Figure 4:
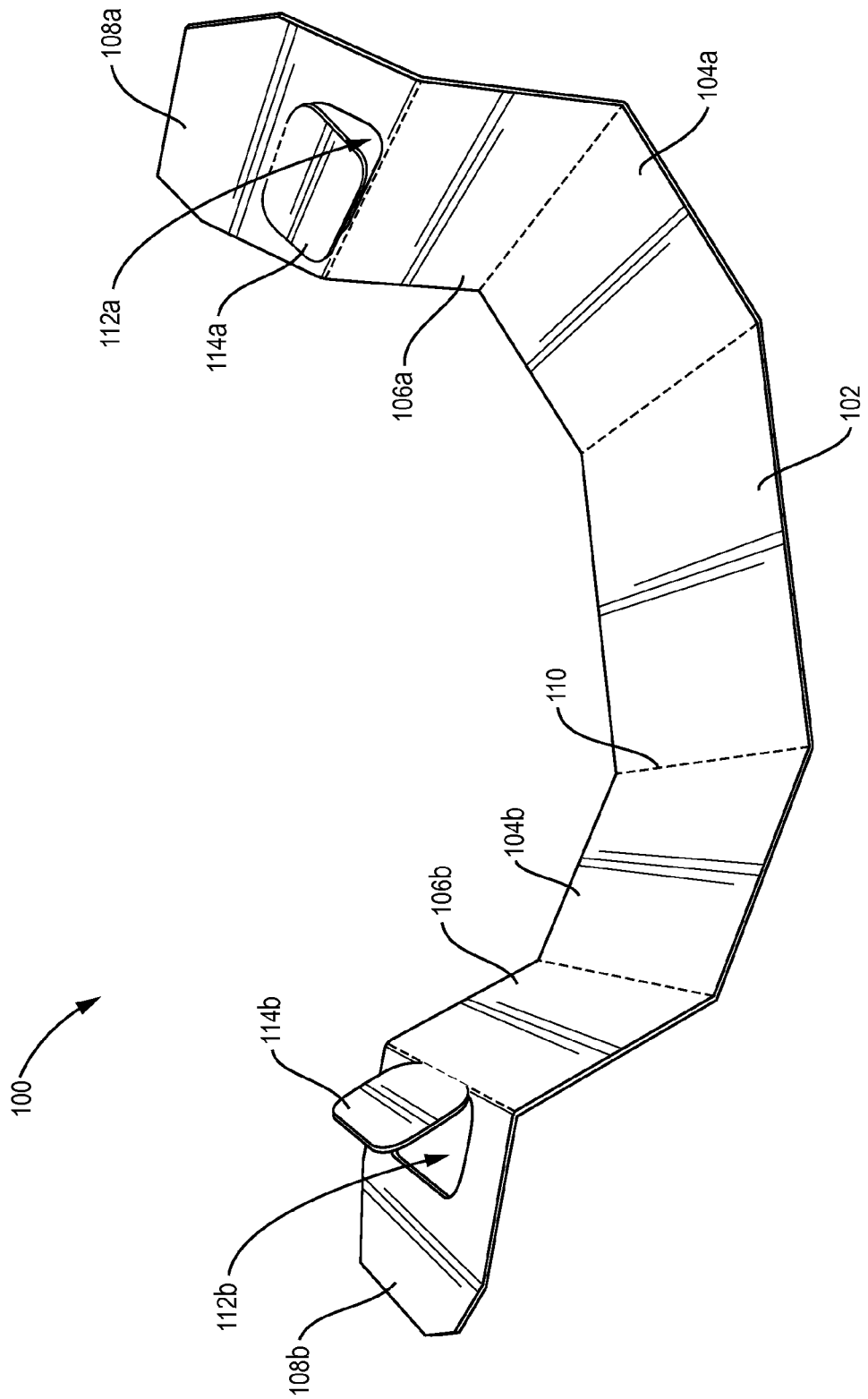
FIG. 4 shows a perspective view of an exemplary comestible product carrier handle blank in a partially folded position.
Figure 5:
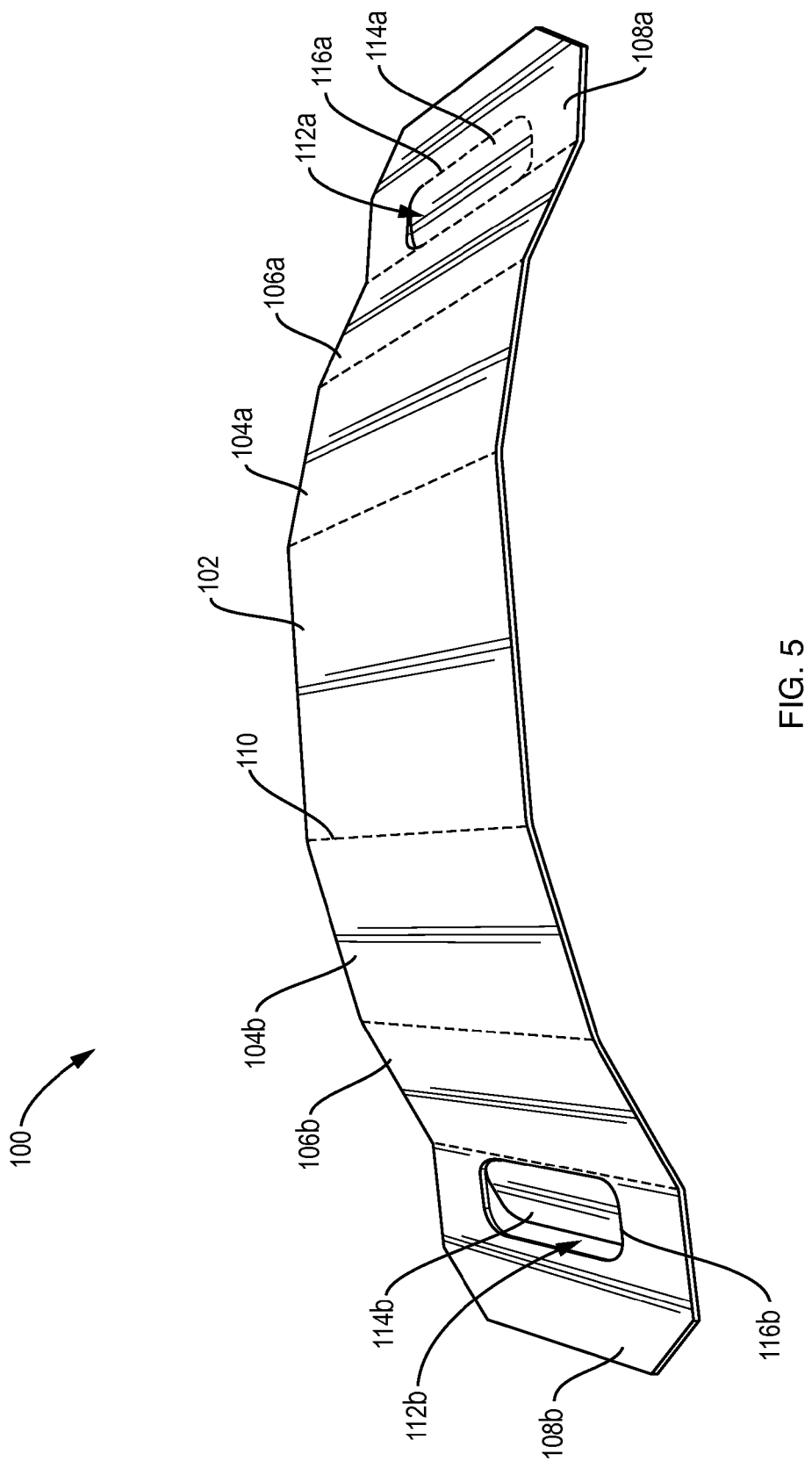
FIG. 5 shows a perspective view of an exemplary comestible product carrier handle blank.

As shown in FIGS. 4 and 5, the handle 100 is in an unfolded state. The handle 100 can be fabricated from, e.g., cardboard and/or any other suitable material. The handle 100 includes the bottom wall portion 102, first and second side wall portions 104a and 104b, and first and second top wall portions 106a and 106b. First and second handle portions 108a and 108b can be hingedly joined to the first and second top wall portions 106a and 106b, respectively. Although illustrated with two side wall portions and two top wall portions, in some exemplary embodiments, the handle 100 can include, e.g., two, three, four, five, six, seven, eight, nine, ten, and the like, side and/or top wall portions. In addition, the outside surfaces of the plurality of wall portions may be decorated with, e.g., graphics, logos, information, advertising, and the like.

The plurality of wall portions, i.e., the bottom wall portion 102, the first and second side wall portions 104a and 104b, and the first and second top wall portions 106a and 106b, can be hingedly joined and/or connected relative to each other at the plurality of score lines 110 which may be creases and/or perforations. In some exemplary embodiments, the plurality of score lines 110 can be pre-formed into the handle 100 prior to use. Similarly, the first and second handle portions 108a and 108b can be hingedly joined and/or connected to the first and second top wall portions 106a and 106b at score lines 110. As would be understood by those of ordinary skill in the art, the plurality of score lines 110 can be implemented to aid in folding the handle 100 blank into a structure configured and dimensioned to wrap around a carrier 200.

With reference to FIG. 5, the first and second handle portions 108a and 108b further include first and second sets of score lines 116a and 116b, respectively. As would be understood by those of ordinary skill in the art, the first and second sets of score lines 116a and 116b can be utilized for creating first and second openings 112a and 112b, respectively. In particular, the first and second sets of score lines 116a and 116b can be utilized to push and/or partially "punch out" first and second flaps 114a and 114b, respectively, out of the first and second handle portions 108a and 108b. First and second openings 112a and 112b can therefore be created, while maintaining the first and second flaps 114a and 114b hingedly joined to the first and second top wall portions 106a and 106b at fold lines 110. As would be understood by those of ordinary skill in the art, the first and second openings 112a and 112b can be configured and dimensioned to receive a human hand such that the handle 100 can be gripped.

As shown in FIGS. 4 and 5, the plurality of wall portions partially folded in preparation for fully folding the handle 100 such that it forms a structure which wraps around a sandwich carrier. As can be seen from FIGS. 4 and 5, the first and second flaps 114a and 114b have been partially "punched out" of the first and second handle portions 108a and 108b. In some exemplary embodiments, the first and second flaps 114a and 114b can be partially "punched out" such that first and second flaps 114a and 114b remain hingedly joined to, e.g., the first and/or second handle portions 108a and 108b, the first and or second top wall portions 106a and 106b, a combination of the two, and the like. In other exemplary embodiments, the first and second flaps 114a and 114b may be fully "punched out" and/or removed of the first and second handle portions 108a and 108b.

The handle 100 can have a first unfolded state and a second folded state to form a structure to secure and carry a comestible product. The side wall portions 104a and 104b can be folded towards each other about their respective score lines 110 and the top wall portions 106a and 106b can be folded inwardly towards each other about their respective score lines 110. The handle portions 108a and 108b can be folded about their respective score lines 110 such that the first and second handle portions 108a and 108b mate against each other and the first and second flaps 114a and 114b can be further implemented for interlocking the first and second handle portions 108a and 108b relative to each other, as shown, e.g., in FIG. 2. For example, the first flap 114a can be pushed through both the first and second openings 112a and 112b to prevent the first and second handle portions 108a and 108b from separating. In some exemplary embodiments, the first and second handle portions 108a and 108b can be interlocked by, e.g., adhesives, staples, and the like.

Figure 6:
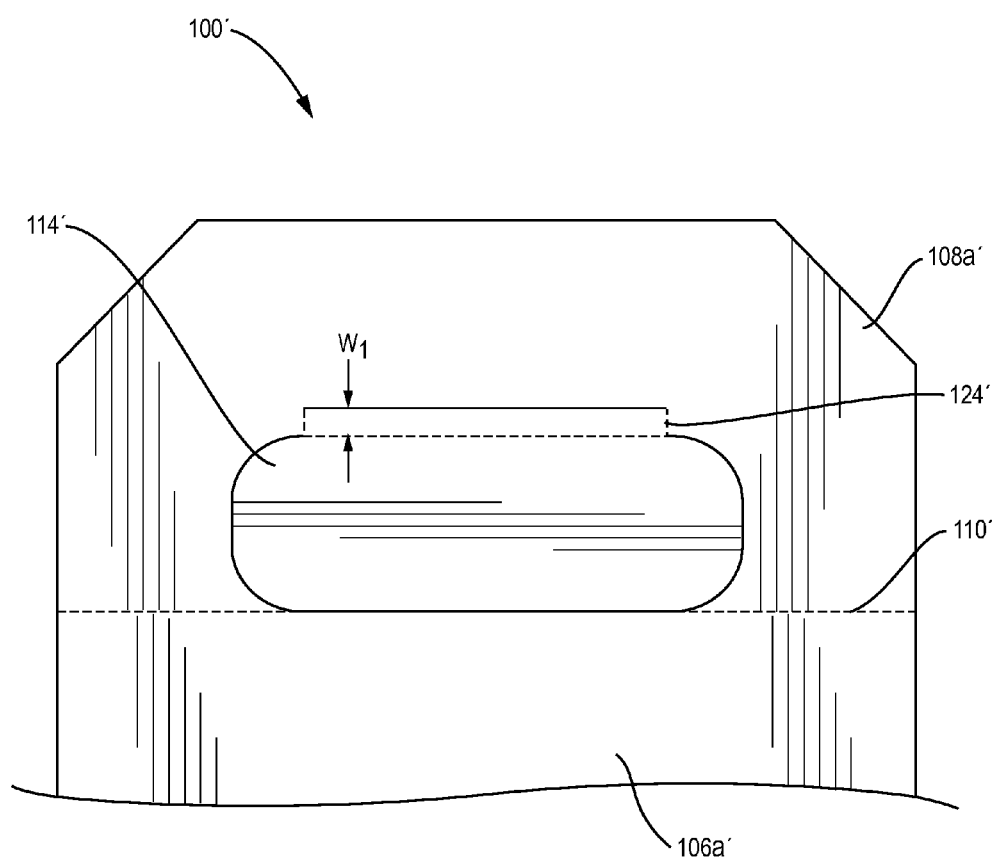
FIG. 6 shows a bottom view of a male handle portion of an exemplary comestible product carrier handle.
Figure 7:
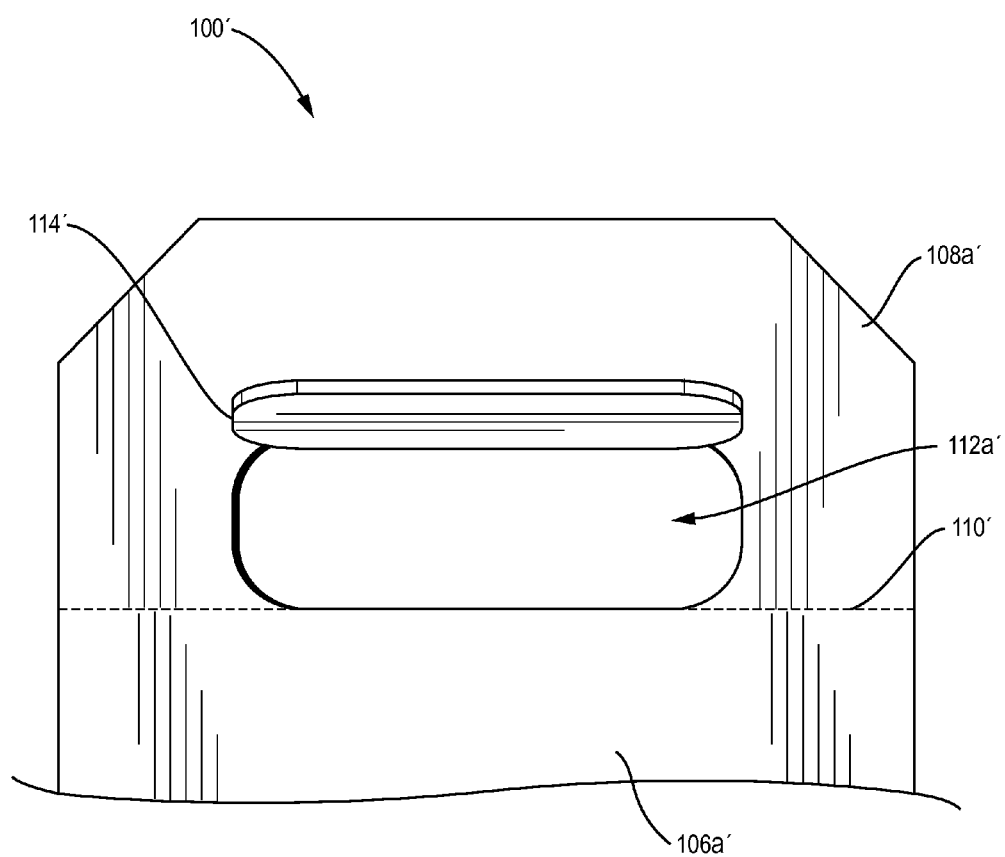
FIG. 7 shows a top view of a male handle portion of an exemplary comestible product carrier handle.
Figure 8:
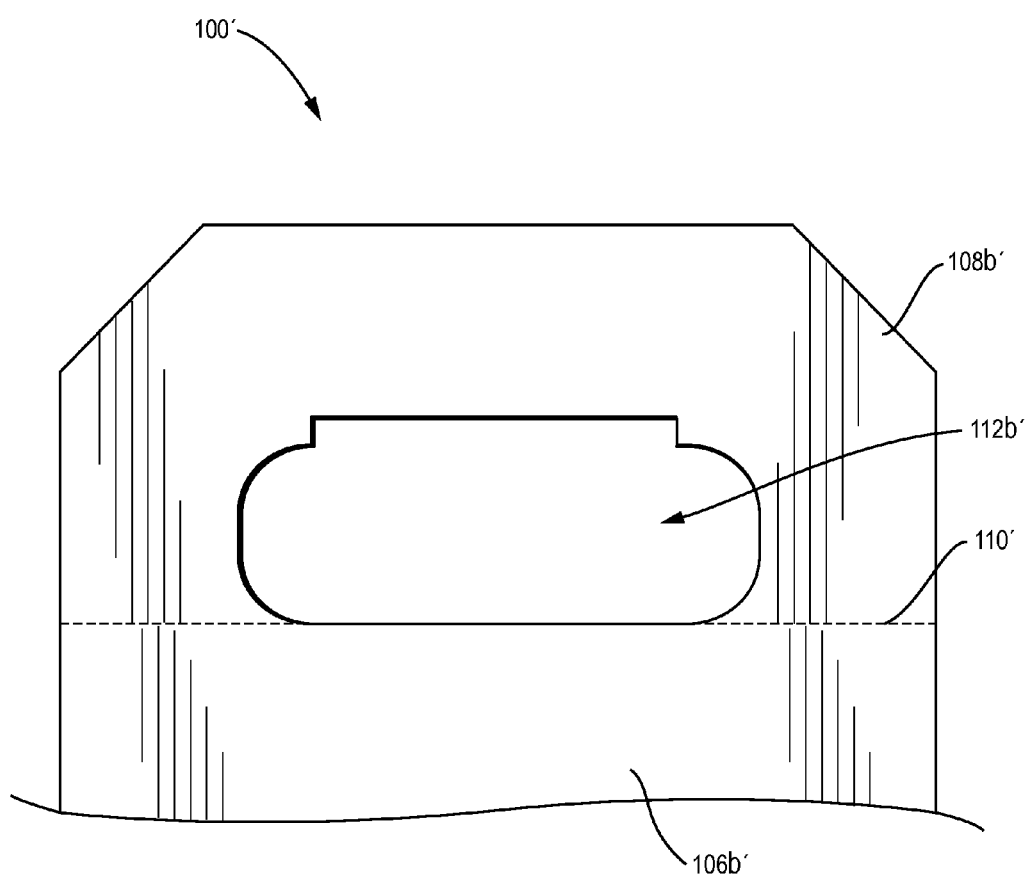
FIG. 8 shows a top view of a female handle portion of an exemplary comestible product carrier handle.

With reference to FIGS. 6-10, an exemplary handle 100' is illustrated, including an exemplary handle locking mechanism. In particular, FIGS. 6 and 7 show an exemplary male handle portion and FIG. 8 shows an exemplary female handle portion. As will be described below, the male and female handle portions can be configured and dimensioned to releasably interlock relative to each other to maintain the handle 100' in a folded configuration.

With reference to FIGS. 6 and 7, the male handle portion of the handle 100' includes a top wall portion 106a', a first handle portion 108a' and a plurality of score lines 110'. The first handle portion 108a' can mate against a second handle portion (shown in FIG. 8) and includes a flap 114' which can be utilized to interlock the first handle portion 108a' and second handle portion relative to each other. The flap 114' can be similar in structure and/or function to the flap 114 previously discussed. In some exemplary embodiments, flap 114' can be hingedly joined and/or connected to the first handle portion 108a' by a connector portion 124'. Connector portion 124' defines a width $W_1$ which can be dimensioned similar to the width of the material utilized to fabricate the handle 100'. As will be discussed below, the width $W_1$ permits the flap 114' to be inserted into and folded around a receiving opening to interlock the first handle portion 108a' and second handle portion. The flap 114' can be, e.g., partially punched out of the first handle portion 108a' to create a first opening 112a'.

FIG. 8 shows a female handle portion of the handle 100' which includes a top wall portion 106b', a second handle portion 108b' and a plurality of score lines 110'. The second handle portion 108b' includes a second opening 112b' configured and dimensioned similar to the first opening 112a'. In particular, the second opening 112b' can be configured and dimensioned to receive the flap 114'.

Figure 9:
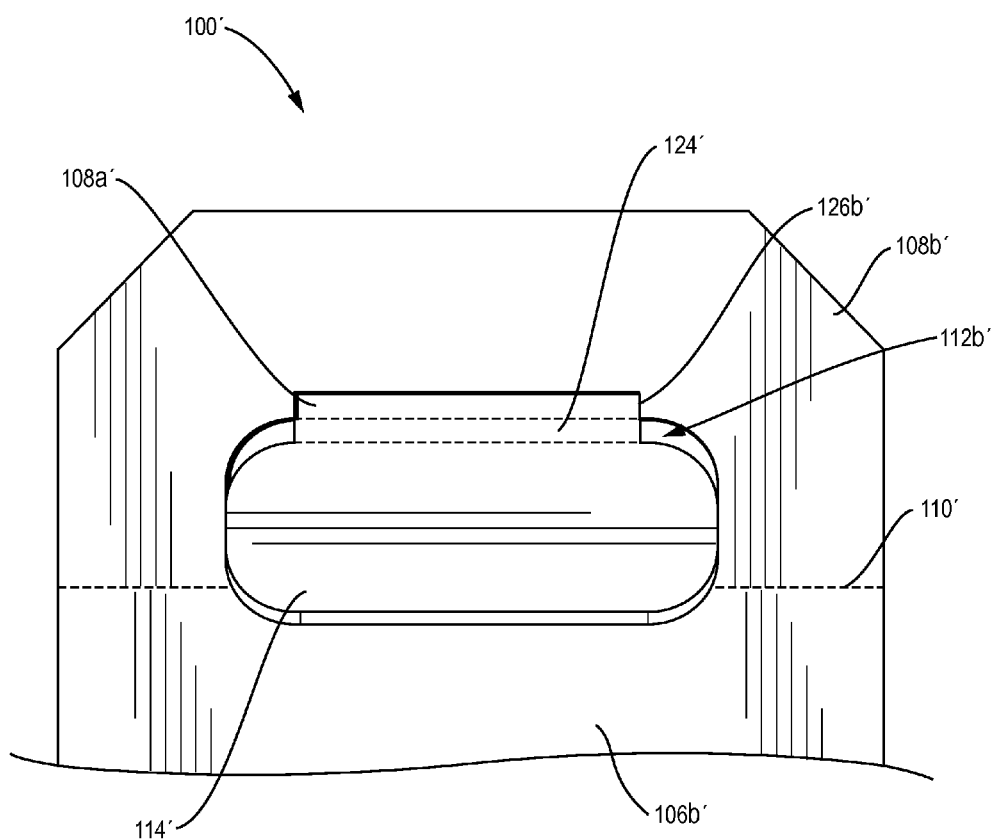
FIG. 9 shows a handle locking mechanism of an exemplary comestible product carrier handle in a partially interlocked position.
Figure 10:
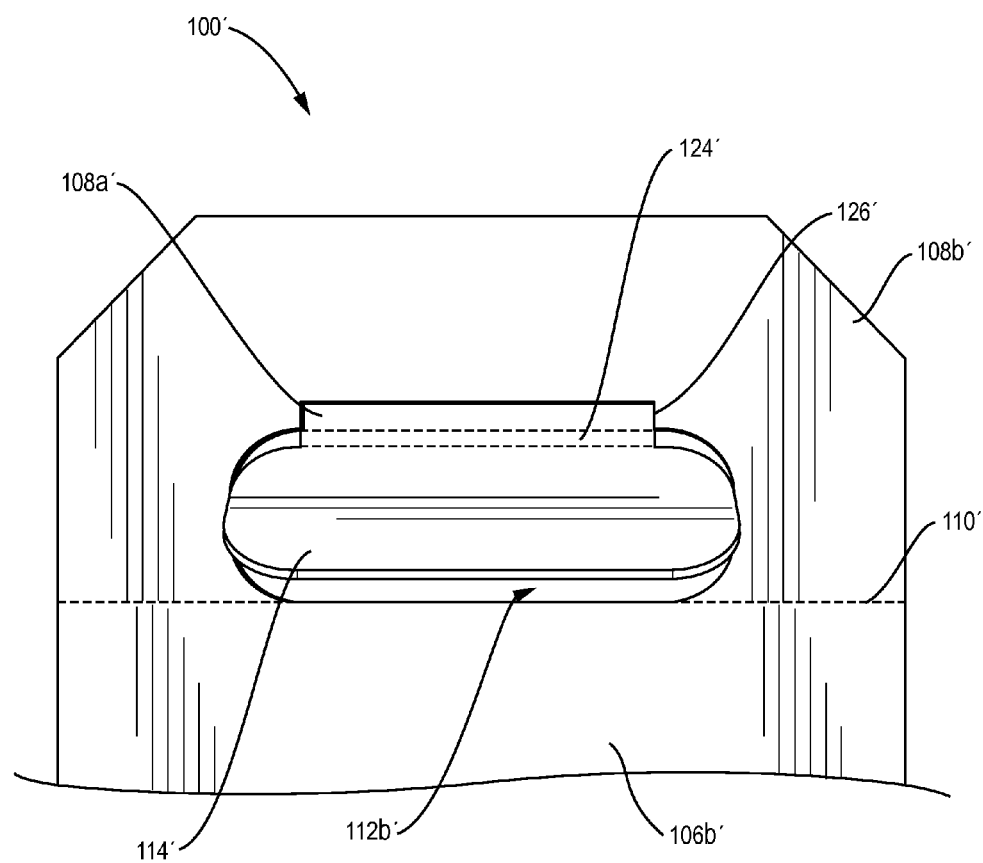
FIG. 10 shows a handle locking mechanism of an exemplary comestible product carrier handle in a partially interlocked position.

FIGS. 9 and 10 illustrate the male and female handle portions, i.e., the handle locking mechanism, of the handle 100' in partially interlocked positions. The first and second handle portions 108a' and 108b' can mate against each other and the flap 114' of the handle portion 108a' can be utilized to interlock the first and second handle portions 108a' and 108b' relative to each other. In particular, the flap 114' can be folded at the connector portion 124' to pass through the second opening 112b' to secure the first and second handle portions 108a' and 108b' together. Due to the width $W_1$ of the connector portion 124', the flap 114' can pass through the second opening 112b' and can further be folded against an outside surface of the second handle portion 108a'. The connector portion 124' can mate with and/or create a friction fit with a complementary groove 126' of the second opening 112b'. In addition, the dimensions of the complementary groove 126' can prevent the flap 114' from receding back and out of the second opening 112b', thereby preventing the first and second handle portions 108a' and 108b' from separating. In some exemplary embodiments, the handle portions 108a' and 108b' can be further fastened to one another using a fastener, such as one or more clamps, clips, staples, adhesives, and/or any other suitable fastener. Further, the first and second openings 112a' and 112b' can be configured and dimensioned to receive a human hand such that the handle 100' can be gripped.

Figure 11:
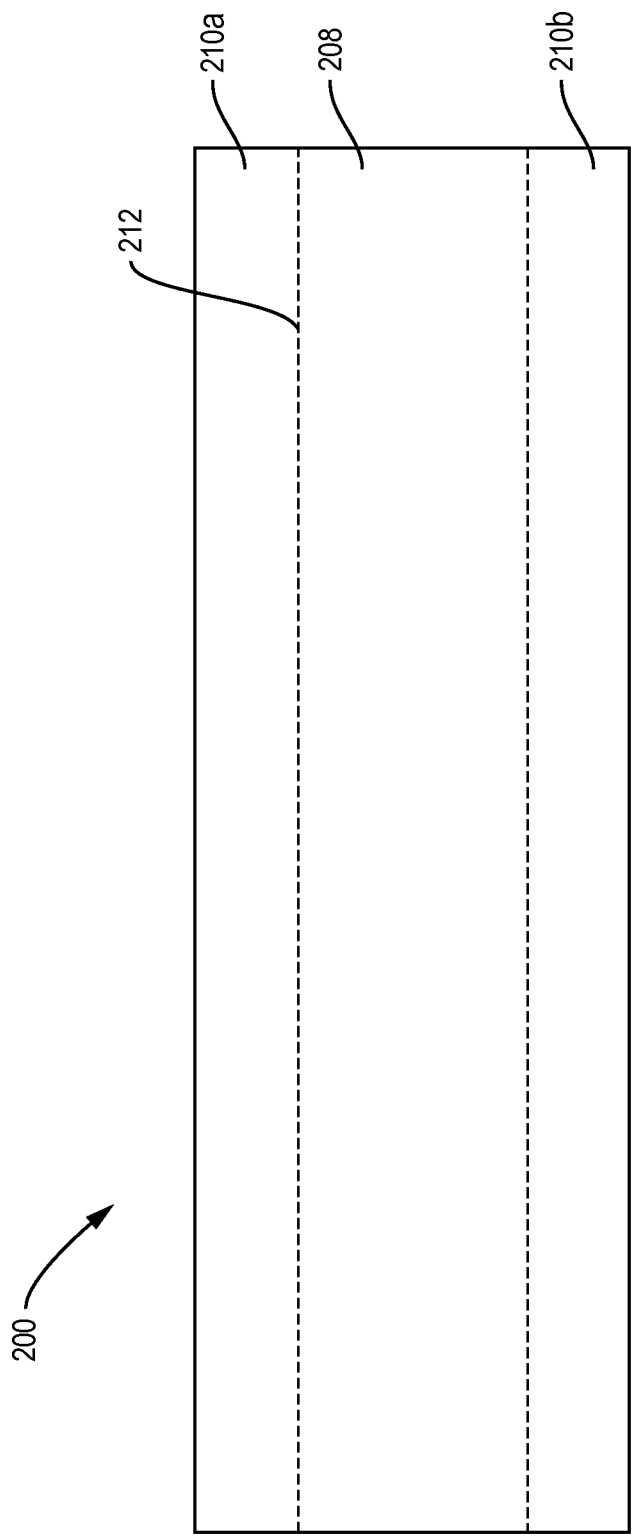
FIG. 11 shows a top view of an exemplary comestible product carrier blank.

With reference to FIG. 11, an exemplary carrier 200 in an unfolded state is provided. The carrier 200 can include the bottom surface 208 and first and second side wall portions 210a and 210b, respectively. The first and second side wall portions 210a and 210b can be hingedly joined and/or connected to the bottom surface 208 at score lines 212 (shown as dashed lines). In some exemplary embodiments, the plurality of score lines 212 can be pre-formed into the carrier 200 blank prior to use. As would be understood by those of ordinary skill in the art, the carrier 200 blank can be folded to form a U-shaped structure. Although discussed herein as a U-shaped carrier 200, in some exemplary embodiments, the carrier 200 may include, e.g., only a bottom surface 208 for supporting a comestible product, alternative configurations, and the like.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for transporting a comestible product carrier, the system comprising:
   a comestible product carrier defining a U-shaped configuration, the comestible product carrier including (i) a bottom wall defining a surface for supporting a length of a comestible product, (ii) two side walls extending from the bottom wall, the two side walls extending a length of the comestible product carrier, and each of the two side walls defining a height, and (iii) an open top opposing the bottom wall;
   an apparatus comprising:
   (i) a bottom wall, (ii) two side walls each defining a height and extending substantially perpendicularly from the bottom wall, each of the two side walls defining a continuous uninterrupted surface, and the two side walls are hingedly joined relative to the bottom wall by a first set of score lines, and (iii) two top walls extending inwardly towards each other from the respective two side walls, the two top walls extending substantially parallel to the bottom wall, and the two top walls are hingedly joined to the respective two side walls by a second set of score lines, wherein the bottom wall, the two side walls and the two top walls are configured and dimensioned to form a structure which wraps around the comestible product carrier;
   a first end hingedly joined to a first of the two top walls and including a first handle portion and a second end hingedly joined to a second of the two top walls and including a second handle portion, the first handle portion including a first opening and a flap joined to the first handle portion by a connector portion, the second handle portion including a second opening with a groove complementary to the connector portion of the first handle portion, the connector portion and the groove being configured to releasably interlock the first and second handle portions to define an inner passage; and a proximal open end and an opposing distal open end of the structure configured and dimensioned to permit passage of the comestible product carrier through the inner passage;

wherein the height of the two side walls of the comestible product carrier is greater than the height of the two side walls of the apparatus such that the side walls of the comestible product carrier engage the bottom wall and the two top walls of the apparatus to form a friction fit to restrict or limit movement of the comestible product carrier relative to the apparatus.

2. The system according to claim 1, wherein the bottom wall of the apparatus supports the comestible product carrier.

3. The system according to claim 1, wherein the two side walls of the apparatus are parallel relative to each other.

4. The system according to claim 1, wherein the first handle portion is hingedly joined to the first of the two top walls of the apparatus and the second handle portion is hingedly joined to the of the two top walls of the apparatus.

5. The system according to claim 1, wherein the first handle portion comprises a third set of score lines for creating the first opening and the second handle portion comprises a fourth set of score lines for creating the second opening and the groove.

6. The system according to claim 5, wherein the first opening and the second opening are configured and dimensioned to receive a hand.

7. The system according to claim 1, wherein the flap of the first handle portion is configured to be inserted into the second opening of the second handle portion to position the connector portion within the groove of the second handle portion.

8. The system according to claim 7, wherein the groove prevents the flap from receding out of the second opening and prevents separation between the first and second handle portions.

9. A method of transporting a comestible product carrier, comprising:

providing a comestible product carrier defining a U-shaped configuration, the comestible product carrier including (i) a bottom wall defining a surface for supporting a length of a comestible product, (ii) two side walls extending from the bottom wall, the two side walls extending a length of the comestible product carrier, and each of the two side walls defining a height, and (iii) an open top opposing the bottom wall;

folding an apparatus, the apparatus including (i) a bottom wall, (ii) two side walls each defining a height and extending substantially perpendicularly from the bottom wall, each of the two side walls defining a continuous uninterrupted surface, and the two side walls are hingedly joined relative to the bottom wall by a first set of score lines, (iii) two top walls extending inwardly towards each other from the respective two side walls, the two op walls extending substantially parallel to the bottom wall, and the two top walls are hingedly joined to the respective two side walls by a second set of score lines, wherein the bottom all, the two side walls and the two top walls are configured and dimensioned to form a structure which wraps around the comestible product carrier, (iv) a first end hingedly joined to a first of the two top walls and including a first handle portion and a second end hingedly joined to a second of the two top walls and including a second handle portion, the first handle portion including a first opening and a flap joined to the first handle portion by a connector portion, the second handle portion including a second opening with a groove complementary to the connector portion of the first handle portion, and (v) a first open end and an opposing second open end of the structure configured and dimensioned to permit the passage of the comestible product carrier therethrough;

wrapping the apparatus around the comestible product carrier; and interlocking the first handle portion and the second handle portion by interlocking the connector portion of the first handle portion with the groove of the second handle portion;

wherein the height of the two side walls of the comestible product carrier is greater than the height of the two side walls of the apparatus such that the side walls of the comestible product carrier engage the bottom wall and the two top walls of the apparatus to form a friction fit to restrict or limit movement of the comestible product carrier relative to the apparatus.

10. The method according to claim 9, further comprising positioning the comestible product in the comestible product carrier.

11. The method according to claim 9, wherein interlocking the first handle portion and the second handle portion comprises inserting the flap of the first handle portion into the second opening of the second handle portion, and positioning the connector portion within the groove of the second handle portion.

12. A system for transporting a comestible product, the system comprising:

a comestible product carrier defining a U-shaped configuration, the comestible product carrier including (i) a bottom wall defining a surface for supporting a length of a comestible product, (ii) two side walls extending from the bottom wall, the two side walls extending a length of the comestible product carrier, and each of the two side walls defining a height, and (iii) an open top opposing the bottom wall; and two handle structures, each handle structure including (i) first and second opposing open ends, (ii) an interior area accessible through the first and second open ends, (iii) a bottom wall, (iv) two side walls each defining a height and extending substantially perpendicularly from the bottom wall, each of the two side walls defining a continuous uninterrupted surface, and the two side walls are hingedly joined relative to the bottom wall by a first set of score lines, (v) two top walls extending inwardly towards each other from the respective two side walls, the two top walls extending substantially parallel to the bottom wall, and the two top walls are hingedly joined to the respective two side walls by a second set of score lines, and (vi) first and second handle portions, each of the two handle structures surrounding a portion of the comestible product carrier so that the bottom wall of each handle structure supports a portion of the surface of the comestible product, the first handle portion including a first opening and a flap joined to the first handle portion by a connector portion, the second handle portion including a second opening with a groove complementary to the connector portion of the first handle portion, the connector portion and the groove being configured to releasably interlock to releasably interlock the first and second handle portions to define an area for grasping each of the two handle structures to facilitate transport of the comestible product carrier, wherein the comestible product carrier extends beyond the first and second opposing open ends of the two handle structures; and wherein the height of the two side walls of the comestible product carrier is greater than the height of the two side walls of the two handle structures such that the side walls of the comestible product carrier engage the bottom wall and the two top walls of the two handle structures to form a friction fit to restrict or limit movement of the comestible product carrier relative to the two handle structures.

13. The system of claim 12, wherein the comestible product carrier is moveable with respect to the two handle structures.

14. The system of claim 12, wherein the two side walls of each of the two handle structures are opposing side walls extending from the bottom wall, and the two top walls extend between the side walls and the first and second handle portions.

15. The system of claim 14, wherein the two top walls extend substantially perpendicularly from the two side walls to define the interior area.

16. The system of claim 12, wherein the two side walls of the comestible product carrier define first and second sides extending from the bottom wall of the comestible product carrier.

17. The system of claim 12, wherein the comestible product carrier is retained within the two handle structures by the friction fit.

18. The system of claim 12, wherein the each of the two handle structures includes surface features to restrict movement of the comestible product carrier within the handle structures.

19. The system of claim 12, further comprising a third handle structure to support a third portion of the comestible product carrier.

20. A system for transporting a comestible product, the system comprising:
a comestible product carrier defining a U-shaped configuration, the comestible product carrier including (i) a bottom wall defining a surface for supporting a length of a comestible product, (ii) two side walls extending from the bottom wall, the two side walls extending a length of the comestible product carrier, and each of the two side walls defining a height, (iii) and an open top opposing the bottom wall; and
two handle structures, each of the two handle structures including (i) first and second opposing open ends, (ii) an interior area accessible through the first and second open ends, (iii) a bottom wall, (iv) two side walls each defining a height and extending substantially perpendicularly from the bottom wall, each of the two side walls defining a continuous uninterrupted surface, and the two side walls are hingedly joined relative to the bottom wall by a first set of score lines, (v) two top walls extending inwardly towards each other from the respective two side walls, the two top walls extending substantially parallel to the bottom wall, and the two top walls are hingedly joined to the respective two side walls by a second set of score lines, and (vi) first and second handle portions, each of the two handle structures surrounding a portion of the comestible product carrier so that the bottom wall of each handle structure supports a portion of the surface of the comestible product, the first handle portion including a first opening and a flap joined to the first handle portion by a connector portion, the second handle portion including a second opening with a groove complementary to the second connector portion of the second handle portion, the connector portion and the groove being configured to releasably interlock the first and second handle portions to define an area for grasping each of the two handle structures to facilitate transport of the comestible product carrier,
wherein the comestible product carrier extends beyond the first and second opposing open ends of the two handle structures;
wherein the comestible product carrier is a unitary structure having a first unfolded state and a second folded state; and
wherein the height of the two side walls of the comestible product carrier is greater than the height of the two side walls of the two handle structures such that the side walls of the comestible product carrier engage the bottom wall and the two top walls of the two handle structures to form a friction fit to restrict or limit movement of the comestible product carrier relative to the two handle structures.

21. The system according to claim 20, wherein the comestible product carrier is a U-board.

* * * * *